United States Patent [19]

Vogel et al.

[11] Patent Number: 4,775,754

[45] Date of Patent: Oct. 4, 1988

[54] PREPARATION OF LEUCO DYES

[75] Inventors: Kim M. Vogel, Woodbury; Roger A. Mader, Stillwater, both of Minn.

[73] Assignee: Minnesota Mining and Manufacturing Company, St. Paul, Minn.

[21] Appl. No.: 106,053

[22] Filed: Oct. 7, 1987

[51] Int. Cl.[4] .................. C07D 241/48; C07D 265/38; C07D 279/28

[52] U.S. Cl. ..................................... 544/103; 544/37; 544/39; 544/69; 544/102; 544/229; 544/347; 544/348; 564/247

[58] Field of Search ...................... 544/37, 39, 69, 102, 544/103, 279, 347, 348

[56] References Cited

U.S. PATENT DOCUMENTS 3,447,944 6/1969 Werner .............................. 117/36.2
3,873,340 3/1975 Miyazawa et al. ................ 117/36.8

FOREIGN PATENT DOCUMENTS 47-4638 2/1972 Japan.

Primary Examiner—Richard L. Raymond
Attorney, Agent, or Firm—Donald M. Sell; Mark A. Litman

[57] ABSTRACT

Oxazine, thiazine and diazine leuco dyes are synthesized through a reaction using a dicyclohexylcarbodiimide adduct. The adducts are themselves novel compounds.

19 Claims, No Drawings

PREPARATION OF LEUCO DYES

BACKGROUND OF THE INVENTION

1. Field of the Invention

Novel derivatives of dicyclohexylcarbodiimides, their process of synthesis and their use in synthesizing oxizine, diazine and thiazine leuco dyes are described.

2. Background of the Art

Leuco dyes are compounds which have found increasing importance in color imaging processes. These leuco dyes tend to be colorless until they are oxidized and then they form a visible color. It is required that these leuco dyes be reactive with moderate oxidizing conditions and yet not be so reactive as to form colors from mere environmental conditions. There are many different chemical classes of leuco dyes known to the imaging chemist.

Oxazine, diazine and thiazine leuco dyes are known to the imaging chemist as shown in Japanese Pat. No. 47-4638, U.S. Pat. No. 3,873,340, and U.S. Pat. No. 3,447,944. One particular class of these azine dyes that has found particular utility in oxidative color imaging processes is the 4-aryloyl derivatives. These azines display a good balance of reactivity and stability and the resultant dyes are also stable.

The typical synthetic procedure for the 4-aryloyl azine dyes involves the acid chloride derivitization of the aromatic acid (e.g., benzoic acid) and its subsequent reaction with an azine to form the appropriately substituted azine leuco dye. This procedure produced useful yields and dyes of pure quality, but in the case of a 3,5-di-tert-butyl hydroxy-substituted benzoic acid the yields were undesirably low because of polymerization of the acid chloride intermediates. The polymerized moieties can be separated from the leuco dyes, but that portion of the intermediate was lost in the production of the leuco dyes.

SUMMARY OF THE INVENTION 4-hydrozybenzoic acids and their 4-trihydracarbylsiloxy derivatives are reacted with dicyclohexylcarbodiimide to form a stable adduct. These adducts are then reacted with oxazines, diazines and thiazines to form the leuco dyes. There is no significant polymerization of the intermediates and yields are increased.

DETAILED DESCRIPTION OF THE INVENTION

In the first step of the process of the present invention, novel dicyclohexylcarbodiimide (DCC) adducts are formed by a reaction with the appropriate aromatic acid. The aromatic acids useful in the practice of the present invention are represented by the formulae:

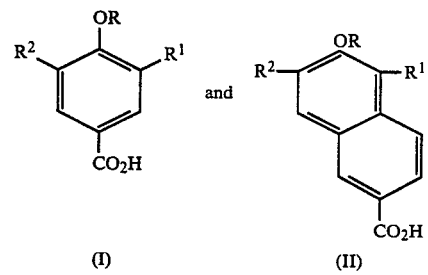

wherein

R is selected from H and $-SiR^3R^4R^5$, $R^3$, $R^4$ and $R^5$ are independently selected from alkyl (preferably of 1 to 8 carbon atoms, linear or branched), and aryl (preferably phenyl) of up to 10 carbon atoms, and when R is H, $R^1$ and $R^2$ are independently selected from 1- or 2-position sterically hindered alkyl groups (e.g., isopropyl, tert-butyl, tert-octyl, tert-amyl, etc.)

and when R is $-SiR^3R^4R^5$, $R^1$ and $R^2$ are independently selected from alkyl (preferably of 1 to 12 carbon atoms, more preferably 1 to 4 carbon atoms), alkoxy (preferably of 1 to 12 carbon atoms, more preferably 1 to 4 carbon atoms), halogen (e.g., chloro, bromo, fluoro, iodo), or hydrogen.

These acids are reacted with DCC in solution (e.g., tetrahydrofuran) at room temperature or with mild heating to form the DCC adduct. Such a reaction may be represented by the formula

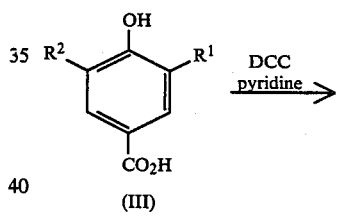

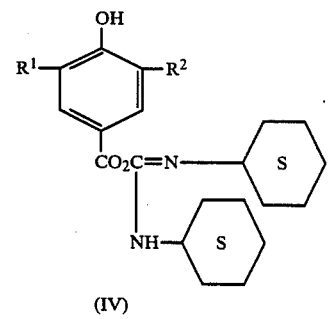

This adduct is then reacted with the desired azine and the leuco dye is formed. Available synthetic paths for the various azines may be summarized by the following formulae:

Oxazines

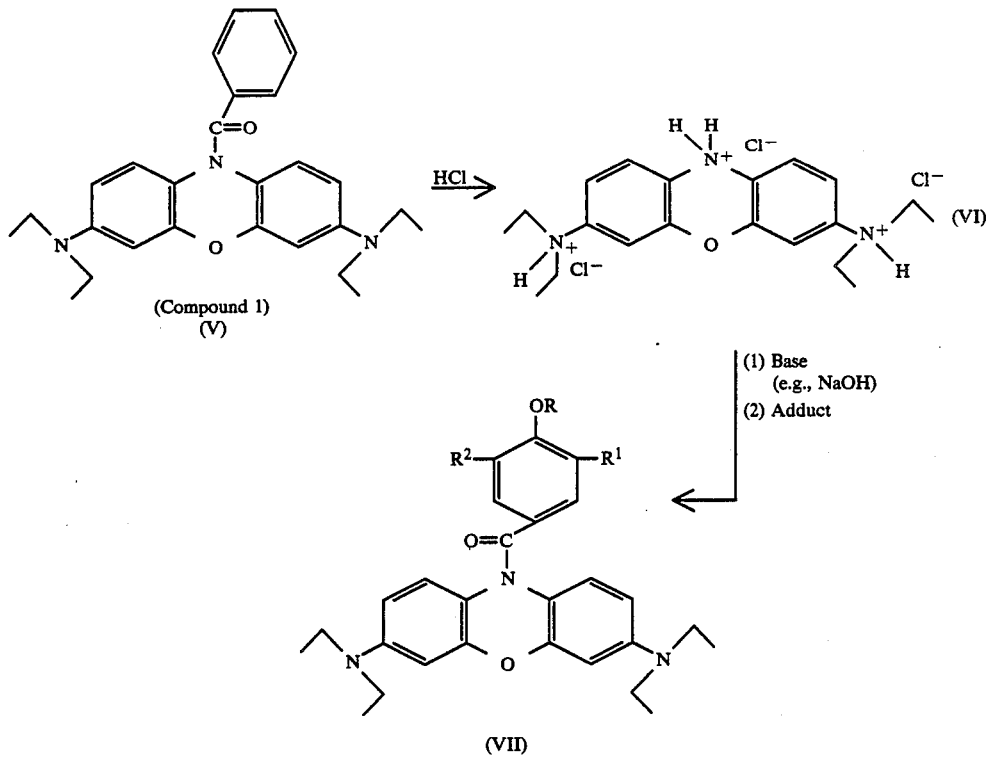

(Compound 1) (V)

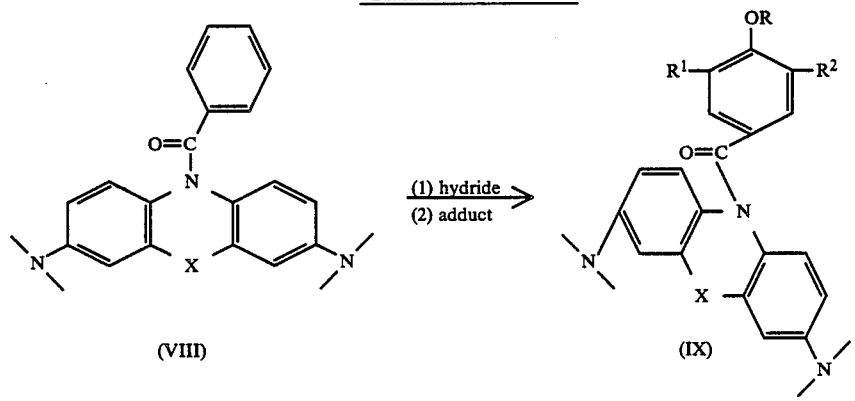

Diazines and Thiazines

X=NR[6], O, or S wherein R[6] is phenyl or alkyl of 2–12 carbon atoms.

The reactions with the adduct should be performed in the absence of water or in environment with only small amounts of water which will react with the adduct. The molar ratio of water to the DCC adduct will approximate the increased loss in the efficiency of the reaction. It is therefore preferred that there be less than 5 molar percent water to DCC adduct in the reaction solution, more preferably less than 1%, and most preferably that there be less than 0.03% water to DCC adduct (essentially anhydrous conditions).

The preferred hydrides useful in the reductive cleavage of the thiazines and diazines in the presence of the DCC adduct are aluminum hydrides or borohydrides. It is more preferred that lithium or sodium counterions be used (e.g., LiAlH$_4$, NaAlH$_4$, LiEt$_3$BH). The reaction of the acidified oxazine is preferably carried out in basic conditions, more preferably in the presence of a hydride or other non-water producing base, most preferably NaH under anhydrous conditions. The preferred conditions for the reductive cleavage of the diazines and thiazines are reducing conditions, more preferably in a basic environment.

The adducts produced as intermediates in the present invention are novel and may be represented by the formula

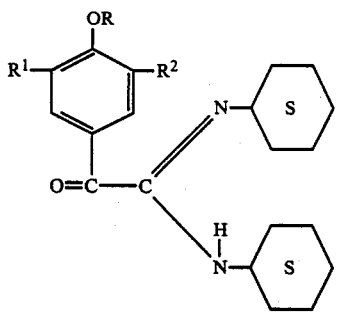

wherein R, $R^1$ and $R^2$ are as defined above.

The oxaines, diazines and triazines useful in the present invention contain the common nucleus

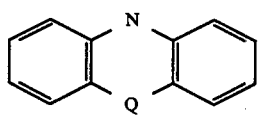

wherein Q is selected from O, S and $NR^6$ wherein $R^6$ is as defined above.

The fused phenyl rings on the azines may be further substituted, particularly with 3,7-di(N,N-dialkylamino) groups, particularly where the alkyl groups have 2 or more carbon atoms (preferably 2–12 carbon atoms) as in

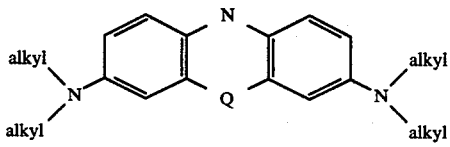

These and other aspects of the invention will be shown in the following non-limiting examples.

EXAMPLE 1

Preparation of hydrochloride salt VI

Pergascript turquoise (V) (500 g, 1.16 mol) and 37% hydrochloric acid (1250 g) were stirred for 12 hr at room temperature. The solid was removed by filtration, slurried with acetone, filtered and dried in a vacuum oven to give 553 g of the hydrochloride salt (VI). This material was analyzed for percent chloride.

Preparation of 3',5'-di-tert-butyl-4'-hydroxybenzoyl-3,7-di(n,N-diethylamino)oxazine (VII)

To the hydrochloride salt VI (478 g, 1.16 mol based on 20.46% chloride analysis) and sodium hydride (60% in mineral oil, 116 g, 2.9 mol) was added 4.47 L tetrahydrofuran and the mixture was stirred for 1.5 hr under an atmosphere of nitrogen at 50° C. until complete deprotonation occured. A mixture of 3,5-di-tert-butyl-4-hydroxybenzoic acid (580 g, 2.3 mol), 1,3-dicyclohexylcarbodiimide (478 g, 2.3 mol) and pyridine (183 g, 2.3 mol) in 3.57 L of tetrahydrofuran was stirred for 30 min. at room temperature under an atmosphere of nitrogen. The solution was transferred to the solution of oxazine described above and the mixture was refluxed for 3 hr. The mixture was cooled to room temperature and 1.79 L of water and 4.47 L of hexane was added. The solution was adjusted to a pH of 7 with 37% aqueous hydrochloric acid, the mixture was filtered to remove the solids and the organic phase was washed three times with water. The organic phase was concentrated and the oily solid was heated to boiling in 1.75 L of hexane and 0.75 L of dichloromethane and cooled to room temperature. The slurry was filtered and the solid was washed well with a solution of 70% hexane/30% dichloromethane. The product was dried at room temperature in a vacuum oven. This solid was purified by boiling in 2.05 L of methanol for 30 min. and then adding 1.0 L of water. The solution was cooled to room temperature and filtered. The product was washed with a 2:1 ratio of methanol/water and dried in a vacuum oven at 35° C. to give 400 g (64% yield) of the desired oxazine VII (mp: 164° C.). This reaction was scaled up to produce 16 lb of the oxazine and a 62% yield was obtained.

EXAMPLE 2

Preparation of 10-(3',5'-di-tert-butyl-4'-hydroxybenzoyl)-3,7-bis(N,N-dimethylamino)-5-(4'-methoxyphenyl)diazine Tetramethyl-phenosafranine (0.535 g, 1.1 mmol) was dissolved in 15 mL of tetrahydrofuran and lithium triethylborohydride (2.91 mL of a 1.0M solution in tetrahydrofuran, 2.91 mmol). The mixture was stirred for 30 min at room temperature under an atmosphere of nitrogen. A mixture of 3,5-di-tert-butyl-4-hydroxybenzoic acid (0.979 g, 3.91 mmol), 1,3-dicyclohexylcarbodiimide (0.807 g, 3.91 mmol) and pyridine (0.316 mL, 3.91 mmol) in 20 mL of tetrahydrofuran was stirred at room temperature under an atmosphere of nitrogen for 30 min. This mixture was transferred to the solution of diazine described above and stirring was continued overnight at room temperature. The mixture was diluted with water, acidified to a pH of 7 with 1N hydrochloric acid, extracted with ethyl acetate, washed with water and brine, dried over magnesium sulfate and the solvent was removed in vacuo. The crude material was purified by flash chromatography on silica gel (20% ethyl acetate/80% petroleum ether as eluent) to give 0.173 g (25% yield) of the desired diazine (IX where $R^6$ is N-para-methoxyphenyl, R is H, and $R^1$ and $R^2$ are t-butyl).

Where a silyl group is formed according to the practice of the present invention (i.e., R is $SiR^3R^4R^5$), the silyl group can be readily cleaved by the addition of any fluoride ion to the solution, generally under neutral or acidic conditions. The hydroxyl group is formed upon cleavage of the silyl.

The notation in the reaction diagrams where ingredients are separately numbered and listed (e.g., (1) hydride, (2) adduct) means that the number 1 component is added and reacted to completion first, and then the second component is added.

What we claim is:

1. A process for the synthesis of azines comprising the steps of forming an adduct of a compound having the formula

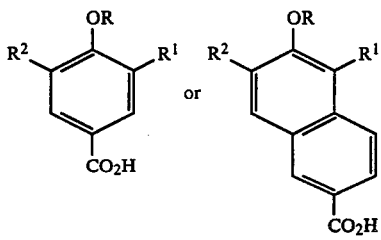 or 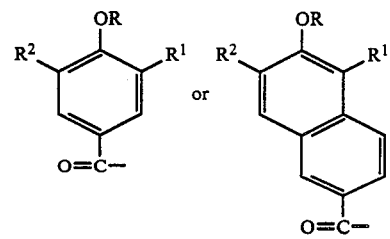 or wherein

R is H or —SiR³R⁴R⁵ where R³, R⁴ and R⁵ are selected from the group consisting of alkyl and aryl, R¹ and R² are independently selected from the group consisting of alkyl, alkoxy and halogen when R is —SiR³R⁴R⁵, and R¹ and R² are independently selected from the group consisting of 1- and 2-position sterically hindered alkyl groups when R is H, and dicyclohexylcarbodiimide in organic solution and then reacting said adduct which has the formula:

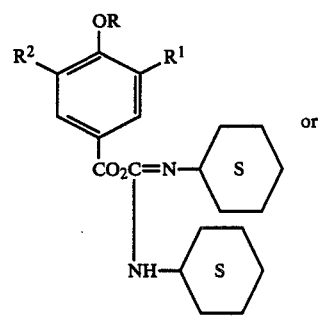 or

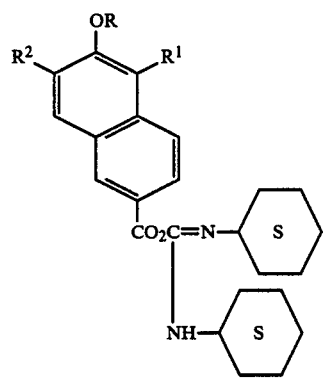

with an azine reactant having a central nucleus represented by the formula

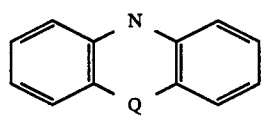

said nitrogen atom of said central nucleus having a reductively clearable group attached thereto or being acidified wherein Q is selected from O, S and NR⁶ when R⁶ is an alkyl or aryl group, said azines having the aromatic group bonded to the required N atom in said central nucleus of said azine reactant.

2. The process of claim 1 wherein said azine has the structural formula

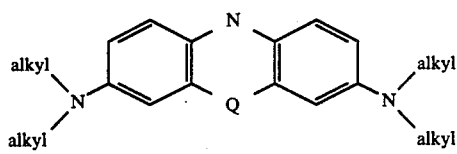

and Q is S, O or NR⁶, the reaction between the adduct and azine is a reductive cleavage, and said aromatic group has the formula:

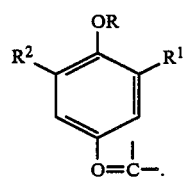

3. The process of claim 2 wherein said reductive cleavage is effected in a basic environment with less than 1% molar ratio of water to adduct.

4. The process of claim 2 wherein said reductive cleavage is effected in a basic anhydrous environment.

5. The process of claim 2 wherein each reductive cleavage is effected in the presence of an aluminum hydride or borohydride.

6. The process of claim 3 wherein each reduction cleavage is effected in the presence of an aluminum hydride or borohydride.

7. The process of claim 4 wherein each reductive cleavage is effected in the presence of an aluminum hydride or borohydride.

8. The process of claim 1 wherein said azine has a common nucleus of the formula

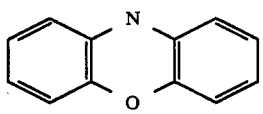

9. The process of claim 8 where said azine has the common nucleus

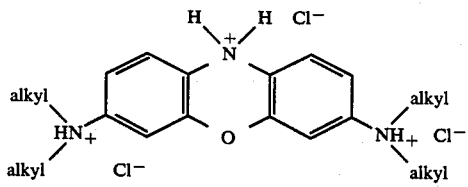

10. The process of claim 9 wherein said adduct and azine are reacted in the presence of less than 1% molar ratio of water to adduct.

11. The process of claim 9 wherein said adduct and azine are reacted in anhydrous conditions.

12. The process of claim 9 wherein said adduct and azine are reacted in the presence of a hydride.

13. The process of claim 12 wherein said hydride is NaH.

14. The process of claim 2 wherein Q is S.
15. The process of claim 3 wherein Q is S.
16. The process of claim 5 wherein Q is S.
17. The process of claim 2 wherein Q is $NR^6$.
18. The process of claim 3 wherein Q is $NR^6$.
19. The process of claim 5 wherein Q is $NR^6$.

* * * * *